United States Patent [19]

Turk et al.

[11] 4,388,097

[45] Jun. 14, 1983

[54] HOT-PRESSED FLUORIDE GLASSES

[75] Inventors: Roger R. Turk, Woodland Hills; Morton Robinson, Agoura, both of Calif.

[73] Assignee: Hughes Aircraft Company, El Segundo, Calif.

[21] Appl. No.: 267,934

[22] Filed: May 28, 1981

[51] Int. Cl.$^3$ .................. C03B 23/20; C03C 3/18
[52] U.S. Cl. .................. 65/64; 65/102; 501/40
[58] Field of Search .................. 501/40; 65/64, 102

[56] References Cited

U.S. PATENT DOCUMENTS

| | | | |
|---|---|---|---|
| 3,900,328 | 8/1975 | Parsons et al. | 501/40 |
| 4,046,545 | 9/1977 | Sanford et al. | 65/102 |
| 4,101,331 | 7/1978 | Anderson | 501/40 |
| 4,141,741 | 2/1979 | Lucas et al. | 501/40 |

FOREIGN PATENT DOCUMENTS 56-9245  1/1981  Japan .................. 501/40

*Primary Examiner*—Mark Bell
*Attorney, Agent, or Firm*—David W. Collins; W. J. Bethurum; A. W. Karambelas

[57] ABSTRACT

Hot pressing of fluoride glasses is provided. These glasses are synthesized from $ZrF_4$-$BaF_2$ and $HfF_4$-$BaF_2$ systems. Hot pressing rough blanks in a closed die made of hard, polished, optically-figured material, such as cobalt-bonded tungsten carbide, is done by pressing the glasses at a temperature between that of the softening point of the glass and its crystallization temperature and at a pressure sufficient to cause flow of the glass at the pressing temperature. As a consequence, mechanical polishing steps on all glass surfaces is eliminated, thereby minimizing surface contamination.

10 Claims, 2 Drawing Figures

HOT-PRESSED FLUORIDE GLASSES

BACKGROUND OF THE INVENTION

1. Field of the Invention

This invention relates to fluoride glasses for use in infrared optical systems, and, more particularly to hot-pressed fluoride glasses.

2. Description of the Prior Art

A great need exists for rugged, infrared transparent glasses capable of being inexpensively fabricated into fiber optic elements and optical components such as laser hoses, windows, prisms, and Faraday rotators. Crystalline materials are, of course, known that are transparent in the infrared portion of the spectrum. These materials, such as ZnSe, NaCl, KCl, are difficult to fabricate inexpensively, since they are either not readily castable or moldable into a variety of sizes and shapes, or they are quite readily attacked by ambient humidity. In oxide glasses, oxygen vibrational modes limit IR transmission to wavelengths shorter than 5 $\mu$m.

In view of the deficiencies of presently available mid-IR transparent glasses, the development of a new family of fluoride-based vitreous materials with transmission extending to 7 to 8 $\mu$m has elicited considerable interest. These fluoride glasses are typically synthesized from $ZrF_4$-$BaF_2$, $HfF_4$-$BaF_2$ and mixtures thereof; see, e.g., U.S. Pat. No. 4,141,741. These glasses are quite hard and strong and are generally resistant to corrosion by environmental moisture. Use of these materials in optical applications, however, has been somewhat limited by the effects of cutting, grinding, polishing and other mechanical working which deform and contaminate surfaces of high purity cast glasses.

SUMMARY OF THE INVENTION

In accordance with the invention, hot-pressed fluoride glasses are provided. These glasses are based on the fluorozirconate and fluorohafnate glass compositions described above.

Use of the hot pressing process in accordance with invention produces high quality optical lenses and flats at low cost by eliminating grinding and polishing of individual surfaces. By eliminating grinding and polishing and other mechanical working, contamination and deformation of the surfaces of high purity cast glasses is avoided. Finally, unusual optical quality surfaces such as corregated surfaces may be prepared in mass production.

DETAILED DESCRIPTION OF THE INVENTION

Figure 1:
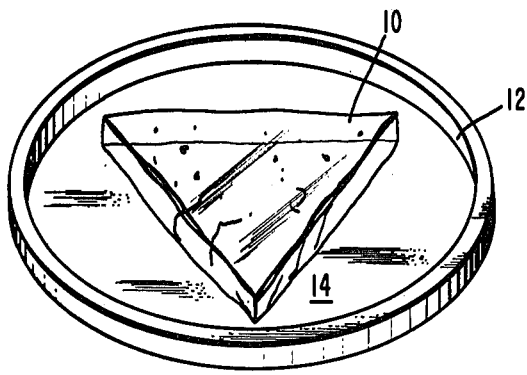
FIG. 1 is a perspective view of a glass sample in a die before hot pressing.

Glasses beneficially prepared in accordance with the invention comprise (a) about 47 to 62 mole percent of at least one component selected from the group consisting of $ZrF_4$ and $HfF_4$, (b) about 23 to 38 mole percent $BaF_2$ and (c) up to about 15 mole percent of at least one component selected from the group consisting of $ThF_4$ and $LaF_3$. The group (a) and (b) components are considered to be glass formers and the group (c) components are considered to be glass stabilizers. In this regard, up to about 10 mole percent of the glass stabilizers may be replaced by other fluorides such as the rare earth fluorides ($CeF_3$ to $LuF_3$), $UF_4$, $AlF_3$, KF, CsF, NaF and RbF. Examples of glasses suitably employed in accordance with the invention include:

(a) 60% $ZrF_4$, 33% $BaF_2$ and 7% $ThF_4$ (ZBT);

(b) 60% $HfF_4$, 33% $BaF_2$ and 7% $ThF_4$ (HBT); and (c) 60% $HfF_4$, 33% $BaF_2$ and 7% $LaF_3$ (HBL).

The metals employed in these glasses are considered to be heavy metals.

The glasses in the foregoing composition range are prepared from the corresponding components at an elevated temperature and cooling at a rate of about 100° to 200° C./min. Compositions outside this range may be obtained at considerably higher cooling rates.

Any process used to prepare these glasses may be employed; accordingly, such preparation does not constitute a part of this invention. For preparation of high purity glasses, the reactive atmosphere process for forming these glasses, disclosed in Vol. 15, Materials Research Bulletin, pp. 735-742 (1980), is suitably employed. Hot pressing in accordance with the invention is suitably employed to fabricate optical components such as flats, lenses and the like. The process of hot pressing to form optical components involves four steps: sample preparation, heating, pressing and cooling.

Sample preparation consists of sawing a cast piece of the glass to fit into a die cavity. This may be done with diamond-impregnated wire, a diamond saw or standard jeweler saw. Alternatively, chunks of the cast glass or even powdered glass may be placed in the die cavity. The die comprises two plungers, both fabricated from a metal carbide having a coefficient of expansion near that of the glass. Further, the elastic modulus of the material employed as a die should be as high as possible in order to ensure that the die will maintain its optical figure under pressure. Tungsten carbide is suitably employed as the die material, since its coefficient of expansion, $5.0 \times 10^{-6}$/°C., is similar to that of the fluoride glasses employed herein, $4.6 \times 10^{-6}$/°C. Further, the elastic modulus of $90 \times 10^6$ for tungsten carbide ensures that the die will maintain its optical figure under pressure. Most preferably, the tungsten carbide material comprises cobalt-bonded particles of tungsten carbide, although nickel or steel may be employed in place of cobalt. In order to obtain a fine optical finish, the lowest possible cobalt content should be employed; about 3 to 4 weight percent of cobalt is preferably employed. A higher cobalt content would render the material tougher and less likely to crack, but the finish would not be as good. On the other hand, for extreme lens shapes, a higher cobalt content, on the order of about 12 weight percent, may be required in order to avoid cracking of the die. The tungsten carbide material also is non-sticking and affords good thermal conductivity, which is important for controlling temperature during the hot pressing process.

The die is loaded with the glass sample sandwiched between the two plungers, placed under light pressure in a hydraulic press in a dry box and flushed with inert gas while heat is applied. A thermocouple, inserted into a hole in the die, may be used for monitoring temperature. External heaters, such as nichrome clamshells or flexible heating strips, may be employed to heat the tungsten carbide die to the required temperature.

The temperature employed during hot pressing ranges from the softening point of the glass to just below its crystallization temperature. For the three glass compositions described above, the hot pressing range is generally about 300° to 400° C. Specifically, for the ZBT glass, the range is 300° to 390° C.; for the HBT glass, the range is 300° to 420° C.; and for the HBL glass, the range is 300° to 430° C. In general, it is preferred that the temperature be at the lower end of the range, since higher pressures tend to reduce the crystallization temperature in these glasses and thus devitrification could occur during hot pressing. Further, the lower temperature region is especially preferred for chunks and powder in order to avoid devitrification.

A moderate pressure is applied to the glass as the desired pressing temperature is approached. The minimum pressure is that sufficient to cause flow; that is, fill the die with material at a temperature at least that of the softening temperature of the glass. During the time of glass flow, the pressure will begin to fall and therefore should be maintained at the desired value. When glass flow ceases, the pressure will remain constant without additional application of load, and the hot pressing process is then terminated. Typically, the pressure applied is on the order of about 1,500 to 4,000 psi. Further, the lower pressure region is especially preferred for chunks and powder in order to avoid devitrification.

Heat to the die is then terminated and the die is allowed to cool naturally while maintaining pressure at the value chosen, until the temperature has dropped at least below the softening point of the glass. The dimensionally-stable temperature for these fluoride glasses is typically about 290° C. At that point, both temperature and pressure may be reduced.

EXAMPLES

Example 1

Hot pressing was accomplished with a 20 ton PHI hydraulic press with readable pressure to 2.5 psi intervals. A 0.5 inch cylindrical tungsten carbide die containing 4% cobalt was used. The faces of the plungers were polished optically flat to $\frac{1}{2}$ fringe (sodium spectral line-5896 Å). The die with sample inside was placed in the press. The temperature was raised to 300° C. and a pressure of 1,920 psi was applied. The temperature was then raised until a pressure drop was indicated due to glass flow (about 307° to 312° C.). The temperature was held constant until the die was filled as indicated by no further pressure drop even as higher temperature was applied. The temperature was then lowered below 300° C., the pressure released and the sample cooled to room temperature. A glass consisting essentially of 60% $ZrF_4$, 33% $BaF_2$ and 7% $ThF_4$, which had been formed by reactive atmosphere processing in accordance with the teachings of the Materials Research Bulletin reference described above, was employed. The hot pressing was done in air. Total height reduction was 31.2%—from 0.218 inch to 0.150 inch. The molded glass surface closely duplicated the die surface.

Example 2

A sample of the same glass composition as Example 1 was hot-formed at a pressure of 3,650 psi and a temperature of 323° C., employing the apparatus and process of Example 1. Duplication of the plunger surface was excellent, even on a microscopic scale. The hot-pressed glass surface duplicated the grinding marks of the tungsten carbide plunger, as well as its optical flatness.

Figure 2:
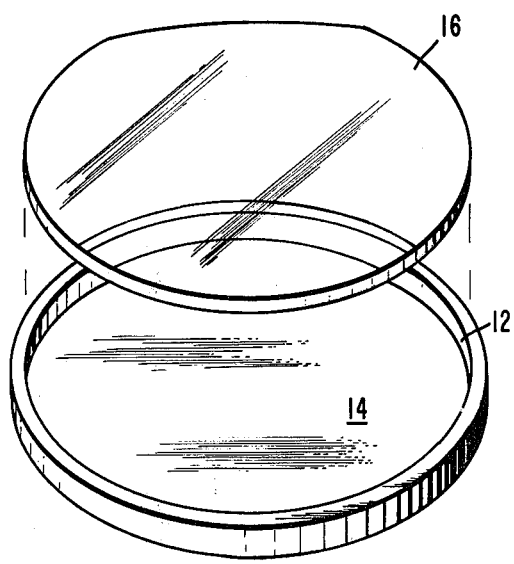
FIG. 2 is a perspective view of the glass sample above the die after hot pressing.

A comparison of the results of hot pressing the fluoride glass is represented in FIG. 1 (before) and FIG. 2 (after). In FIG. 1, a glass sample 10 of irregular shape is shown in a portion of a die 12, resting on the top surface of plunger 14. The imperfections depicted are representative of the actual imperfections observed. In FIG. 2, the hot-pressed fluoride glass 16 is shown above the die. The transparency, indicating lack of devitrification, and the approximately round shape of the hot-pressed glass are representative of the actual results obtained.

What is claimed is:

1. A process for hot-pressing two or more pieces of a fluoride glass or powder thereof to consolidate and form a unitary piece, said fluoride glass having a composition comprising about 47 to 62 mole percent of at least one component selected from the group consisting of $HfF_4$ and $ZrF_4$, about 23 to 38 mole percent of $BaF_2$ and up to about 15 mole percent of at least one component selected from the group consisting of $ThF_4$ and $LaF_3$, the process comprising pressing the fluoride glass at a temperature ranging from the softening point of the glass to just below the crystallization temperature of the glass and at a pressure which is at least sufficient to cause flow of the glass at that temperature.

2. The process of claim 1 in which the glass composition is one selected from the group consisting of (a) 60 mole percent $ZrF_4$, 33 mole percent $BaF_2$ and 7 mole percent $ThF_4$; (b) 60 mole percent $HfF_4$, 33 mole percent $BaF_2$ and 7 mole percent $ThF_4$; and (c) 60 mole percent $HfF_4$, 33 mole percent $BaF_2$ and 7 mole percent $LaF_3$.

3. The process of claim 1 in which the temperature is at least about 300° C.

4. The process of claim 1 in which the pressure ranges from about 1,500 to 4,000 psi.

5. The process of claim 1 in which up to about 10 mole percent of at least one of $ThF_4$ and $LaF_3$ is replaced by at least one component selected from the group consisting of rare earth fluorides, $UF_4$, $AlF_3$, KF, CsF, NaF and RbF.

6. A process for forming an optical component which comprises pressing two or more pieces of a fluoride glass or powder thereof to consolidate and form a unitary piece at a temperature ranging from the softening point of the glass to just below the crystallization temperature of the glass and at a pressure which is at least sufficient to cause flow of the glass at that temperature, the fluoride glass having a composition comprising about 47 to 62 mole percent of at least one component selected from the group consisting of $HfF_4$ and $ZrF_4$, about 23 to 38 mole percent of $BaF_2$ and up to about 15 mole percent of at least one component selected from the group consisting of $ThF_4$ and $LaF_3$.

7. The process of claim 6 in which the glass composition is one selected from the group consisting of (a) 60 mole percent $ZrF_4$, 33 mole percent $BaF_2$ and 7 mole percent $ThF_4$; (b) 60 mole percent $HfF_4$, 33 mole percent $BaF_2$ and 7 mole percent $ThF_4$; and (c) 60 mole percent $HfF_4$, 33 mole percent $BaF_2$ and 7 mole percent $LaF_3$.

8. The process of claim 6 in which the temperature is at least about 300° C.

9. The process of claim 6 in which the pressure ranges from about 1,500 to 4,000 psi.

10. The process of claim 6 in which up to about 10 mole percent of at least one of $ThF_4$ and $LaF_3$ is replaced by at least one component selected from the group consisting of rare earth fluorides, $UF_4$, $AlF_3$, KF, CsF, NaF and RbF.

* * * * *